US011990099B2

(12) United States Patent
Ji et al.

(10) Patent No.: US 11,990,099 B2
(45) Date of Patent: May 21, 2024

(54) SOURCE DRIVER INTEGRATED CIRCUIT AND DISPLAY DRIVING DEVICE

(71) Applicant: LX Semicon Co., Ltd., Daejeon (KR)

(72) Inventors: Seung Hwan Ji, Daejeon (KR); Ho Sung Hong, Daejeon (KR); Ye Ji Lee, Daejeon (KR); Jung Bae Yun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/336,576

(22) Filed: Jun. 16, 2023

(65) Prior Publication Data

US 2023/0335067 A1 Oct. 19, 2023

Related U.S. Application Data

(63) Continuation of application No. 17/544,864, filed on Dec. 7, 2021, now Pat. No. 11,721,293.

(30) Foreign Application Priority Data

Dec. 16, 2020 (KR) ........................ 10-2020-0176088

(51) Int. Cl.
*G09G 3/3291* (2016.01)

(52) U.S. Cl.
CPC ... *G09G 3/3291* (2013.01); *G09G 2300/0408* (2013.01); *G09G 2300/0842* (2013.01); *G09G 2310/08* (2013.01)

(58) Field of Classification Search
CPC .. G09G 3/3233; G09G 3/3291; G09G 3/3208; G09G 2300/0819; G09G 2300/0861; G09G 2300/0426; G09G 2300/0439; G09G 2310/0251; G09G 2310/061; G09G 2320/045; G09G 2320/043; G09G 2320/0233; G09G 2320/0271; G09G 2320/0295; G09G 2230/00
See application file for complete search history.

(56) References Cited

U.S. PATENT DOCUMENTS

| | | | |
|---|---|---|---|
| 9,111,491 | B2 | 8/2015 | Woo et al. |
| 9,870,737 | B2 | 1/2018 | Lee et al. |
| 10,347,692 | B2 | 7/2019 | Lee et al. |
| 11,049,459 | B2 | 6/2021 | Kim |
| 2002/0180494 | A1 | 12/2002 | Mawatari et al. |
| 2014/0176525 | A1 | 6/2014 | Woo et al. |

(Continued)

FOREIGN PATENT DOCUMENTS

| | | | |
|---|---|---|---|
| JP | 6037391 | B2 | 12/2016 |
| JP | 6461774 | B2 | 1/2019 |

(Continued)

*Primary Examiner* — Dong Hui Liang
(74) *Attorney, Agent, or Firm* — ROTHWELL, FIGG, ERNST & MANBECK, P.C.

(57) ABSTRACT

Provided a source driver integrated circuit (IC) and a display driving device eliminating an existing input pad and internal wiring of a source driver integrated circuit (IC) for receiving a sensing reference voltage from an external voltage source by allowing the sensing reference voltage for initializing pixels during sensing of the pixels to be generated by an internal voltage source, rather than the external voltage source.

20 Claims, 9 Drawing Sheets

(56) References Cited

U.S. PATENT DOCUMENTS

| | | | | |
|---|---|---|---|---|
| 2016/0189622 | A1 | 6/2016 | Lee et al. | |
| 2018/0114815 | A1 | 4/2018 | Lee et al. | |
| 2019/0325822 | A1* | 10/2019 | Li | G09G 3/3233 |
| 2020/0184902 | A1* | 6/2020 | Kim | G09G 3/3291 |
| 2021/0201797 | A1* | 7/2021 | Lee | G09G 3/3258 |

FOREIGN PATENT DOCUMENTS

| | | | |
|---|---|---|---|
| KR | 10-2018-0045937 | A | 5/2018 |
| KR | 10-1978798 | B1 | 5/2019 |
| KR | 10-2020-0070804 | A | 6/2020 |

* cited by examiner

SOURCE DRIVER INTEGRATED CIRCUIT AND DISPLAY DRIVING DEVICE

CROSS REFERENCE TO RELATED APPLICATION

This application is a continuation application of U.S. patent application Ser. No. 17/544,864 filed on Dec. 7, 2021, which claims priority from Korean Patent Application No. 10-2020-0176088, filed on Dec. 16, 2020, all of which are hereby incorporated by reference in their entirety for all purposes as if fully set forth herein.

BACKGROUND OF THE DISCLOSURE

Field of the Disclosure

The present disclosure relates to a source driver integrated circuit and a display driving device.

Related Art

In general, organic light emitting display devices display a desired image by controlling pixels by individually supplying data voltages according to image information to organic light emitting diode (OLED) pixels arranged in a matrix form.

Panels applied to organic light emitting display devices, i.e., display panels in which OLED pixels are arranged, have extended in applications due to characteristics of being light in weight and thin and being driven with low power consumption.

Here, each pixel includes an OLED, a driving thin film transistor (TFT), and the like. As a driving time of the pixels increases, driving characteristics of the OLED or TFT, i.e., the electrical characteristics of the pixels, change. The change in electrical characteristics may be different in each pixel. When the electrical characteristics of the pixels are different, a luminance deviation occurs even between the pixels to which the same data voltage is input, so that image quality of the OLED display device may be deteriorated.

In order to prevent deterioration of the image quality of the OLED display device, it is necessary to compensate for the change in the electrical characteristics of the pixels.

An external compensation technology is known as a technology for compensating for changes in such electrical characteristics of the pixels.

In order to implement the external compensation technology in the organic light emitting display device, a pixel sensing circuit should be mounted in a source driver integrated circuit (IC) of the organic light emitting display device.

Here, since a data driving circuit for driving the pixels is basically mounted in the source driver IC, if the pixel sensing circuit is further mounted in the source driver IC, a size of the source driver IC increases and the number of wirings for electrically connecting the IC and the display panel and the number of internal wirings of the source driver IC increases.

SUMMARY

The present disclosure provides a technology for eliminating an existing input pad and internal wiring of a source driver integrated circuit (IC) for receiving a sensing reference voltage from an external voltage source by allowing the sensing reference voltage for initializing pixels during sensing of the pixels to be generated by an internal voltage source, rather than the external voltage source.

In an aspect, a source driver integrated circuit (IC) includes: an internal ground GND; a first switch circuit including a first input terminal electrically connected to the internal ground GND and a first output terminal electrically connected to a sensing line of a display panel, configured to transfer, when turned on in a sensing mode, a sensing reference voltage supplied from the internal ground GND to the sensing line, and configured to be turned off in a display mode; a driving reference voltage input pad to which a driving reference voltage supplied from an external voltage source is input; a second switch circuit including a second input terminal electrically connected to the driving reference voltage input pad and a second output terminal electrically connected to the sensing line, configured to transfer, when turned on in the display mode, the driving reference voltage to the sensing line, and configured to be turned off in the sensing mode; and a sensing channel circuit electrically connected to the internal ground in the sensing mode and configured to receive an electrical characteristic of a pixel included in the display panel through the sensing line.

The source driver IC may further include: a data channel circuit configured to supply a data voltage to a data line connected to the pixel in the display mode.

The pixel may include an organic light emitting diode (OLED), a driving transistor, and a switching transistor, and the switching transistor may be turned on in the sensing mode.

The electrical characteristic of the pixel may include one or more of a threshold voltage of the driving transistor and parasitic capacitance of the OLED.

In the sensing mode, the first switch circuit may be temporarily turned on and then turned off, and when the first switch circuit is turned off in the sensing mode, the switching transistor may be turned on.

When the first switch circuit is temporarily turned on, the sensing reference voltage may be transferred to a first node of the driving transistor through the sensing line and a voltage of the first node may be initialized with the sensing reference voltage.

When the first switch circuit is turned off and the switching transistor is turned on, a data voltage for sensing may be transferred to a second node of the driving transistor.

An analog signal including the electrical characteristic of the pixel may be formed at the first node, and the analog signal may be transferred to the sensing channel circuit through the sensing line.

In another aspect, the present disclosure provides a display driving device comprising: a data driving circuit to supply a data voltage to a data line of a display panel in a display mode; and a pixel sensing circuit, comprising an internal ground, to electrically connect a sensing line of the display panel with the internal ground and to initialize a voltage of the sensing line to be a sensing reference voltage supplied from the internal ground in a sensing mode.

The pixel sensing circuit may further comprise a first switch circuit comprising a first input terminal electrically connected to the internal ground and a first output terminal electrically connected to the sensing line, configured to transfer, when turned on in the sensing mode, the sensing reference voltage supplied from the internal ground to the sensing line, and configured to be turned off in the display mode; a driving reference voltage input pad to which a driving reference voltage supplied from an external voltage source is input; a second switch circuit including a second input terminal electrically connected to the driving reference voltage input pad and a second output terminal electrically connected to the sensing line, configured to transfer, when turned on in the display mode, the driving reference voltage to the sensing line, and configured to be turned off in the sensing mode; and a sensing channel circuit electrically connected to the internal ground in the sensing mode and configured to receive an electrical characteristic of a pixel included in the display panel through the sensing line.

The first switch circuit may temporarily be turned on, and then, turned off in the sensing mode.

The second switch circuit may be temporarily turned on, and then, turned off in the display mode.

As described above, according to the present embodiment, since the switch circuit for selectively receiving the sensing reference voltage from the pixel sensing circuit and the internal ground are electrically connected to each other and the sensing reference voltage generated in the internal ground is input to the pixel sensing circuit, the existing input pad and internal wiring for receiving the sensing reference voltage from an external voltage source may be removed from the source driver IC. Accordingly, the size of the source driver IC and the number of internal wirings may be reduced.

In addition, since the ground voltage of the internal ground is used as the sensing reference voltage in the source driver IC, a circuit for generating the sensing reference voltage in an external voltage source may also be removed and a wiring for transferring the sensing reference voltage between the source driver IC and the external voltage source may also be removed. Accordingly, manufacturing cost of the display device may be reduced.

DESCRIPTION OF EMBODIMENTS

Figure 1:
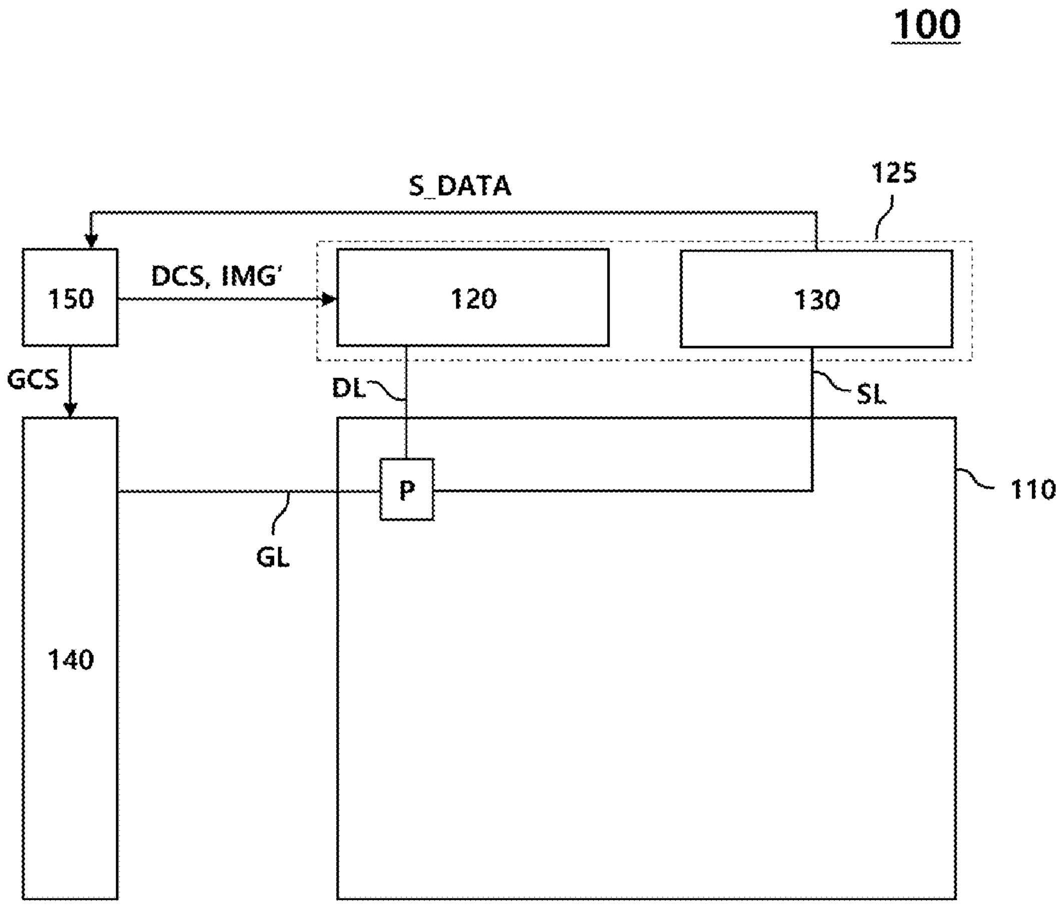
FIG. 1 is a block diagram of a general display device.

FIG. 1 is a block diagram of a general display device.

Referring to FIG. 1, a general display device 100 may include a display panel 110 and display driving devices 120, 130, 140, and 150 for driving the display panel 110.

Figure 3:
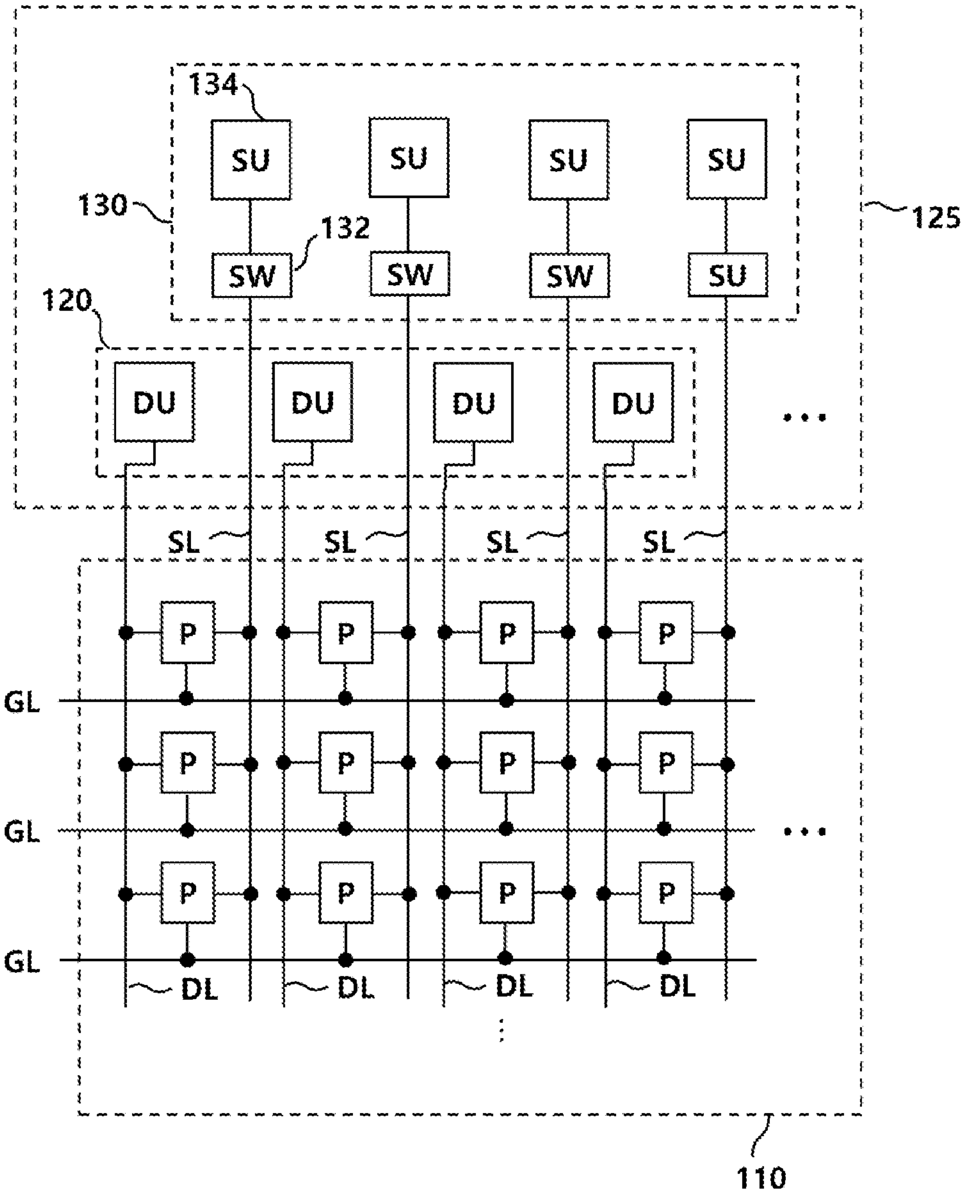

In the display panel 110, a plurality of data lines DL, a plurality of gate lines GL, and a plurality of pixel sensing lines SL may be disposed and a plurality of pixels P may be arranged. Here, the plurality of pixels P may be arranged in a matrix form including a plurality of rows and a plurality of columns as shown in FIG. 3.

Devices 120, 130, 140, and 150 for driving at least one component included in the display panel 110 may be referred to as display driving devices. For example, a data driving circuit 120, a pixel sensing circuit 130, a gate driving circuit 140, a data processing circuit 150, etc.

Each of the devices 120, 130, 140, and 150 described above may be referred to as a display driving device, and all or a plurality of devices may be referred to as a display driving device.

In the display driving device, the gate driving circuit 140 may supply a scan signal having a turn-on voltage or a turn-off voltage to the gate line GL. When the scan signal having the turn-on voltage is supplied to the pixel P, the corresponding pixel P is connected to the data line DL, and when the scan signal having the turn-off voltage is supplied to the pixel P, the pixel P and the data line DL are disconnected.

Here, the gate driving circuit 140 may be referred to as a gate driver integrated circuit (IC). Although only one gate driving circuit 140 is illustrated in FIG. 1, a general display device 100 may include one or more gate driving circuits 140.

In the display driving device, the data driving circuit 120 supplies a data voltage to the data line DL. The data voltage supplied to the data line DL is transferred to the pixel P connected to the data line DL according to the scan signal.

In the display driving device, the pixel sensing circuit 130 receives an analog signal (e.g., voltage, current, etc.) formed in each pixel P. The pixel sensing circuit 130 may be connected to each pixel P according to the scan signal or may be connected to each pixel P according to a separate sensing signal. Here, the separate sensing signal may be generated by the gate driving circuit 140.

The pixels P may include an organic light emitting diode (OLED) and one or more transistors. Characteristics of the OLED and the transistor included in each pixel P may change according to time or a surrounding environment. The general pixel sensing circuit 130 may sense characteristics of these components included in each pixel P and transmit the same to the data processing circuit 150 to be described below.

Figure 2:
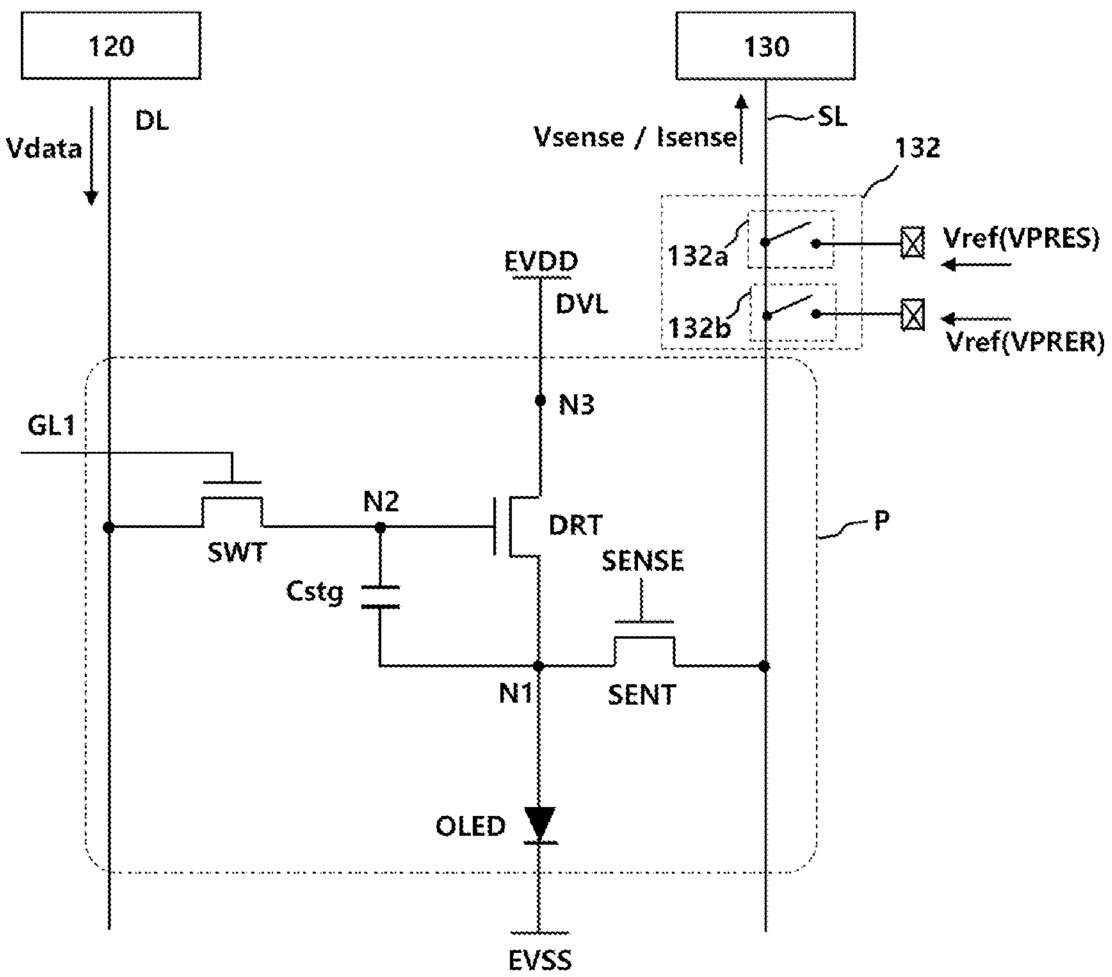
FIGS. 2 and 3 are views illustrating a configuration of a general display panel and a source driver integrated circuit (IC).

Specifically, the pixel P may include an OLED, a driving transistor DRT, a switching transistor SWT, a sensing transistor SENT, and a storage capacitor Cstg as shown in FIG. 2.

In addition, the OLED may include an anode electrode, an organic layer, and a cathode electrode. Under the control of the driving transistor DRT, the anode electrode is connected to a driving voltage EVDD and the cathode electrode is connected to a base voltage EVSS to emit light. In other words, as the driving transistor DRT is turned on, a driving current may be supplied from the driving voltage EVDD side so that the OLED may emit light, and a voltage according to a characteristic of the OLED may be formed between the anode electrode and the cathode electrode.

The driving transistor DRT may control brightness of the OLED by controlling the driving current supplied to the OLED.

A first node N1 of the driving transistor DRT may be electrically connected to the anode electrode of the OLED and may be a source node or a drain node. A second node N2 of the driving transistor DRT may be electrically connected to a source node or a drain node of the switching transistor SWT and may be a gate node. A third node N3 of the driving transistor DRT may be electrically connected to a driving voltage line DVL supplying the driving voltage EVDD and may be a drain node or a source node.

The switching transistor SWT may be electrically connected between the data line DL and the second node N2 of the driving transistor DRT and may be turned on upon receiving the scan signal through the gate lines GL1 and GL2.

When the switching transistor SWT is turned on in a sensing mode, a data voltage Vdata for sensing (or a sensing data voltage Vdata) supplied from the data driving circuit 120 through the data line DL is transferred to the second node N2 of the driving transistor DRT.

The storage capacitor Cstg may be electrically connected between the first node N1 and the second node N2 of the driving transistor DRT.

The storage capacitor Cstg may be a parasitic capacitor existing between the first node N1 and the second node N2 of the driving transistor DRT and may be an external capacitor intentionally designed outside the driving transistor DRT.

Before the switching transistor SWT is turned on in the sensing mode, i.e., at an initial stage of the sensing mode, the sensing transistor SENT connects the first node N1 of the driving transistor DRT and the sensing line SL. In addition, a first switch circuit 132*a* of a switch circuit 132 of the pixel sensing circuit 130 is temporarily turned on.

Through this, a sensing reference voltage VPRES is transferred to the first node N1, and the voltage of the first node N1 is initialized to the sensing reference voltage VPRES.

When the first switch circuit 132*a* is turned off in the sensing mode, the switching transistor SWT is turned on and the sensing data voltage Vdata is transferred to the second node N2 of the driving transistor DRT.

At this time, an analog signal, e.g., a voltage or a current, is formed at the first node N1. In addition, the analog signal of the first node N1 may be transferred to the pixel sensing circuit 130 through the sensing line SL.

Also, the pixel sensing circuit 130 measures an electrical characteristic of the pixel P using the analog signal (Vsense or Isense) transferred through the sensing line SL.

By measuring the voltage of the first node N1, a threshold voltage, mobility, and a current characteristic of the driving transistor DRT may be recognized. In addition, when the voltage of the first node N1 is measured, the degree of degradation of the OLED such as parasitic capacitance and a current characteristic of the OLED may be recognized.

The pixel sensing circuit 130 may measure the voltage of the first node N1, i.e., electrical characteristic values of the pixels P and transmit pixel sensing data, which is digital data including the electrical characteristic values, to the data processing circuit (150 of FIG. 1). In addition, the data processing circuit (150 of FIG. 1) may recognize the characteristic of each pixel P through the pixel sensing data.

As described above, the data driving circuit 120 and the pixel sensing circuit 130 may be included in a single IC 125. In addition, the single IC 125 may be referred to as a source driver IC.

Although only the single source driver IC 125 is shown in FIG. 1, in reality, the general display device 100 may include one or more source driver ICs 125.

Meanwhile, in a general display mode in which the data driving circuit 120 supplies a data voltage to the data line DL, a second switch circuit 132*b* of the switch circuit 132 of the pixel sensing circuit 130 is temporarily turned on and then turned off. Here, a time when the second switch circuit 132*b* is temporarily turned on and then turned off may be an initial stage of the display mode.

Through this, a driving reference voltage VPRER is transferred to the first node N1, and the voltage of the first node N1 is initialized to the driving reference voltage VPRER. Here, the driving reference voltage VPRER may be set to a high potential voltage having a potential higher than the sensing reference voltage VPRES.

In the display driving device, the data processing circuit 150 may supply various control signals to the gate driving circuit 140 and the data driving circuit 120. The data processing circuit 150 may generate a gate control signal GCS for starting a scan according to timing implemented in each frame and transmit the generated gate control signal GCS to the gate driving circuit 140. In addition, the data processing circuit 150 may output image data IMG', which is obtained by converting image data IMG input from an external according to a data signal format used in the data driving circuit 120, to the data driving circuit 120. Also, the data processing circuit 150 may transmit a data control signal DCS for controlling the data driving circuit 120 to supply a data voltage to each pixel P according to each timing.

In addition, the data processing circuit 150 may compensate for the image data IMG' according to the characteristic of the pixel P and transmit the compensated image data IMG'. In this case, the data processing circuit 150 may receive pixel sensing data S_DATA from the pixel sensing circuit 130. Further, the data processing circuit 150 may generate compensation value data using the pixel sensing data S_DATA and compensate for the image data IMG' using the compensation value data. Here, the pixel sensing data S_DATA may include a characteristic value for the characteristic of the pixel P.

The data processing circuit 150 described above may be referred to as a timing controller.

Meanwhile, in the general display device 100, as shown in FIG. 3, the data driving circuit 120 included in the source driver IC 125 may include a plurality of data channel circuits DU connected to the data lines DL of the display panel 110 and the pixel sensing circuit 130 includes a plurality of switch circuits 132 and a plurality of sensing channel circuits 134 SU connected to the sensing lines SL, and thus, an area of the source driver IC 125 increases.

Figure 4:
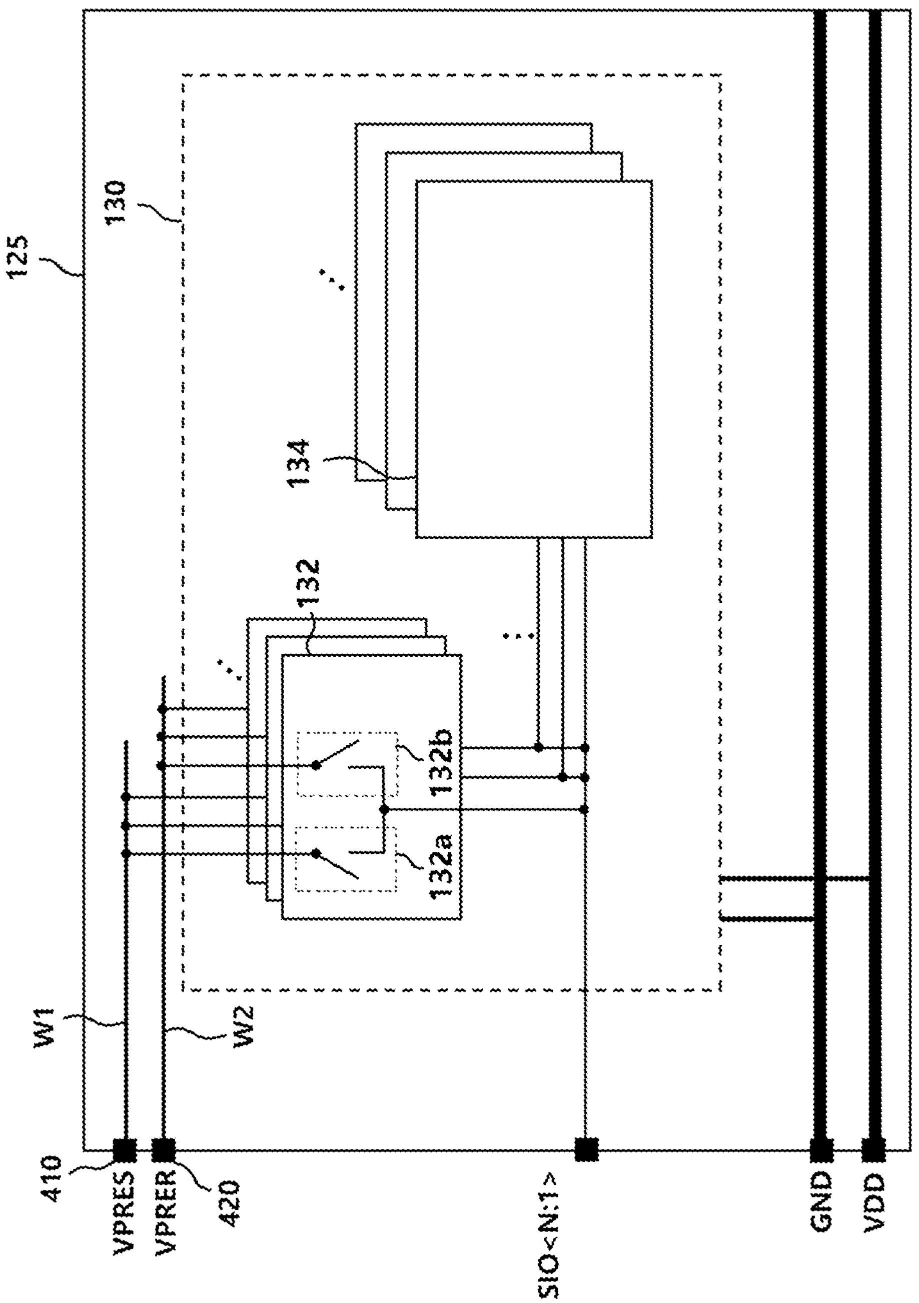
FIG. 4 is a view illustrating a configuration of a pixel sensing circuit in a general source driver IC.

In addition, in the general pixel sensing circuit 130, the sensing reference voltage VPRES and the driving reference voltage VPRER are supplied from an external voltage source (not shown) located outside the source driver IC 125, a first input pad 410 and a second input pad 420 for receiving the sensing reference voltage VPRES and the driving reference voltage VPRER from an external voltage source (not shown) should be formed in the source driver IC 125 as shown in FIG. 4. As a result, a size of the source driver IC 125 increases.

In addition, a first internal wiring W1 for electrically connecting the first input pad 410 to a plurality of switch circuits 132 and a second internal wiring W2 for electrically connecting the second input pad 420 to a plurality of switch circuits 132 are arranged inside the source driver IC 125, thereby increasing the overall number of the internal wirings in the source driver IC 125.

In an embodiment, in order to reduce the size of the source driver IC and the number of internal wirings, a ground voltage generated from an internal ground GND of the source driver IC 125 is used as the sensing reference voltage VPRES and the existing first input pad 410 and the first internal wiring W1 are removed from the source driver IC. A detailed description thereof is as follows.

Figure 5:
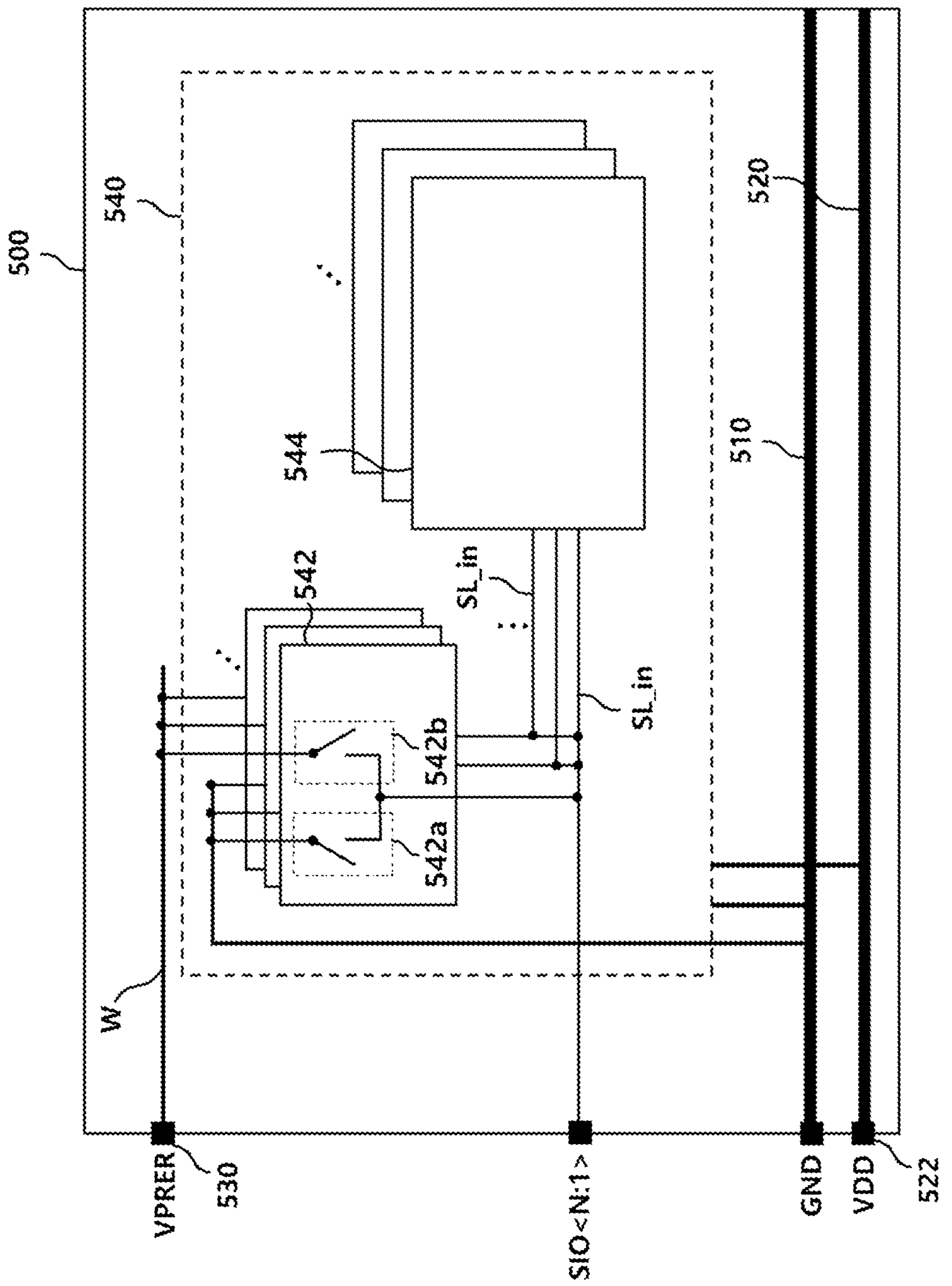
FIGS. 5 and 6 are views illustrating a configuration of a pixel sensing circuit in a source driver IC according to an embodiment.
Figure 6:
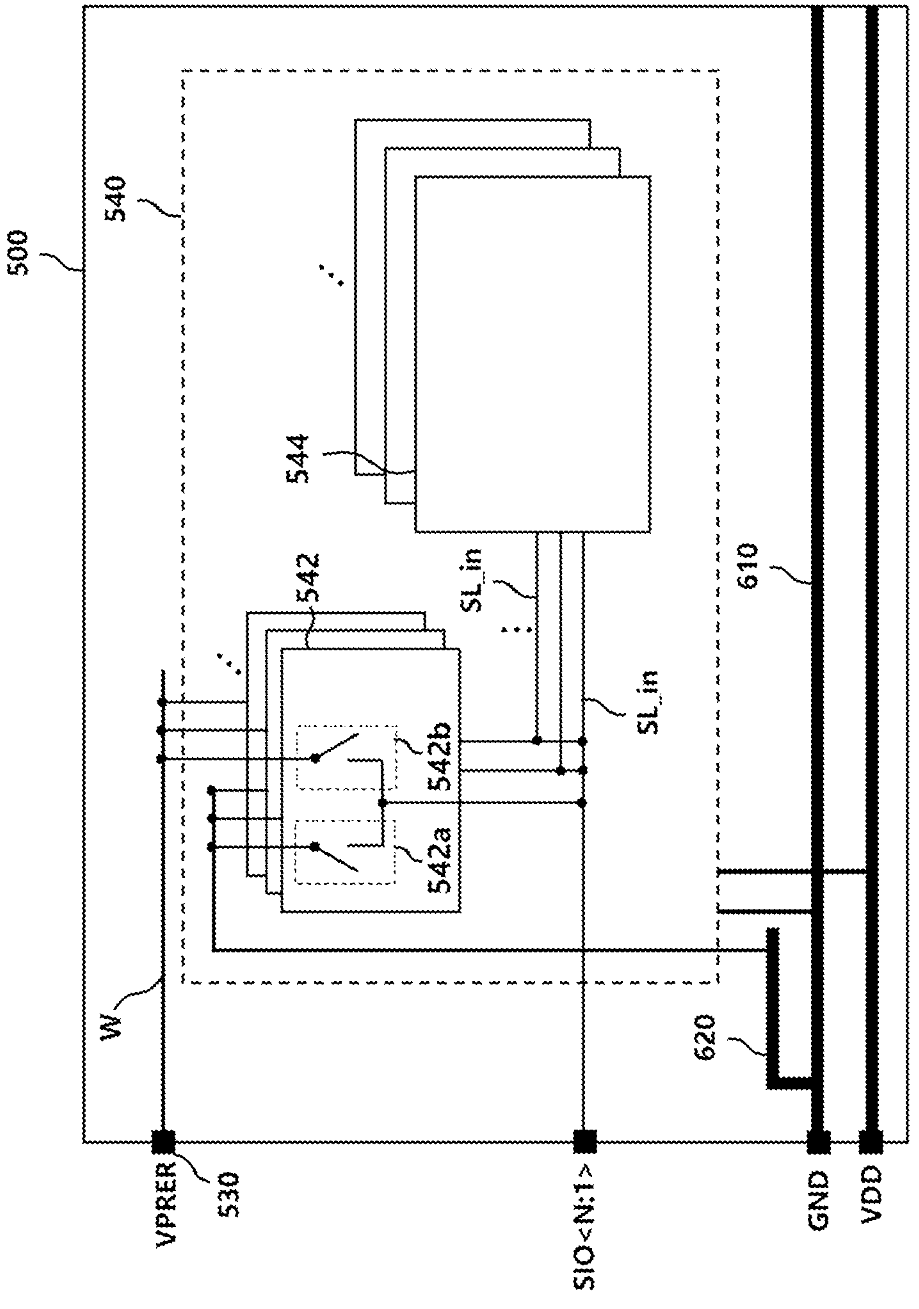

FIGS. 5 and 6 are views illustrating a configuration of a pixel sensing circuit in a source driver IC according to an embodiment.

Referring to FIG. 5, a source driver IC 500 according to an embodiment may include an internal ground GND 510, a source voltage wiring 520, a driving reference voltage input pad 530, and a pixel sensing circuit 540.

The internal ground GND 510 generates a ground voltage having a reference potential of the circuits included in the source driver IC 500. Here, the ground voltage may be a low potential voltage that is greater than 0V (volt) and smaller than a source voltage VDD.

The internal ground GND 510 described above is electrically connected to the circuits included in the source driver IC 500.

The source voltage wiring 520 supplies a source voltage input through a power input pad 522 to the circuits included in the source driver IC 500. To this end, the source voltage wiring 520 may be electrically connected to the circuits included in the source driver IC 500.

The driving reference voltage input pad 530 receives a driving reference voltage supplied from an external voltage source (not shown). The driving reference voltage input to the driving reference voltage input pad 530 may be transferred to a second input terminal of a second switch circuit 542*b* through an internal wiring W.

The pixel sensing circuit 540 may include two or more switching circuits 542 and two or more sensing channel circuits 544.

The switch circuit 542 may include a first switch circuit 542*a* and a second switch circuit 542*b*.

The first switch circuit 542*a* may include a first input terminal electrically connected to the internal ground GND 510 and a first output terminal electrically connected to a sensing line of the display panel. Here, the first output terminal may be electrically connected to an internal line for sensing (or a sensing internal line) SL_in, and the sensing internal line SL_in may be electrically connected to the sensing line of the display panel through a sensing input/output pad SIO.

This first switch circuit 542*a* may be temporarily turned on in the sensing mode. Through this, a sensing reference voltage supplied from the internal ground GND 510 may be transferred to the sensing line.

Here, the sensing reference voltage is a voltage for initializing a voltage of the sensing line and the pixel, i.e., the voltage of the first node (N1 of FIG. 2) to a low potential.

In an embodiment, since a ground voltage generated by the internal ground GND 510 is a low potential voltage, the ground voltage is used as a sensing voltage by electrically connecting the internal ground GND 510 to the first input terminal of the first switch circuit 542*a*.

Through this, the first input pad (410 of FIG. 4) and the first internal wiring (W1 of FIG. 4) may be excluded from the source driver IC 500 according to an embodiment.

Meanwhile, in the display mode, the first switch circuit 542*a* may be turned off. In other words, in the display mode, the first switch circuit 542*a* may be maintained in a turned-off state.

The second switch circuit 542*b* may include a second input terminal electrically connected to the driving reference voltage input pad 530 and a second output terminal electrically connected to the sensing line. Here, the second output terminal may be electrically connected to the sensing internal line SL_in, and the sensing internal line SL_in may be electrically connected to the sensing line of the display panel through the sensing input/output pad MO.

This second switch circuit 542*b* may be temporarily turned on in the display mode. Through this, the driving reference voltage transferred to the internal wiring W may be transferred to the sensing line.

Here, the driving reference voltage may be a high potential voltage having a potential higher than that of the sensing reference voltage.

Meanwhile, in the sensing mode, the second switch circuit 542*b* may be turned off. In other words, in the sensing mode, the second switch circuit 542*b* may be maintained in a turned-off state.

The sensing channel circuit 544 may be electrically connected to the internal ground GND 510.

In the sensing mode, the sensing channel circuit 544 may receive an electrical characteristic of a pixel included in the display panel through the sensing line.

The sensing channel circuit 544 may output a sensing voltage corresponding to the electrical characteristic of the pixel. Here, the electrical characteristic of the pixel may be a current characteristic or a voltage characteristic of the pixel.

Figure 8:
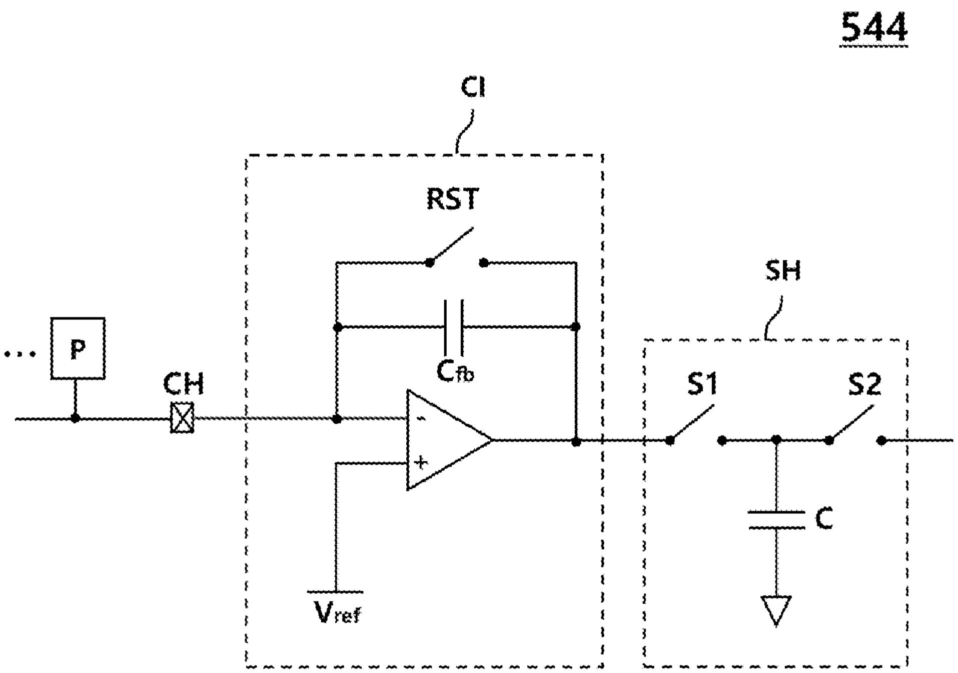
FIGS. 8 and 9 are diagrams illustrating a configuration of a sensing channel circuit.

When the electrical characteristic of the pixel is the current characteristic of the pixel, the sensing channel circuit 544 may include a current integrator circuit CI integrating a current characteristics of a pixel and outputting an integrated value and a sample and hold circuit SH sampling and holding the integrated value and outputting a sensing voltage as shown in FIG. 8.

Here, the current integrator circuit CI and the sample and hold circuit SH may be electrically connected to the internal ground GND 510.

Figure 9:
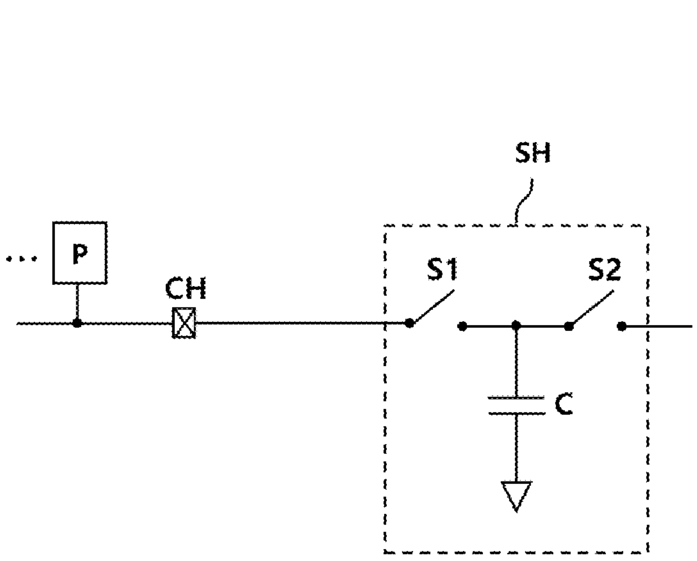

Meanwhile, when the electrical characteristic of the pixel is the voltage characteristic of the pixel, the sensing channel circuit 544 may include a sample and hold circuit SH sampling and holding the voltage characteristic of the pixel and outputting a sensing voltage as shown in FIG. 9. Here, the sample and hold circuit SH may be electrically connected to the internal ground GND 510.

As described above, in an embodiment, since the first input terminal of the first switch circuit 542*a* is electrically connected to the internal ground GND 510 inside the source driver IC 500 and the ground voltage of the internal ground GND 510 is used as the sensing reference voltage, the input pad (410 of FIG. 4) and the internal wiring (W1 of FIG. 4) for receiving the sensing reference voltage from the outside may be removed from the source driver IC 500.

Meanwhile, since the internal ground GND 510 of the source driver IC 500 may be connected to a circuit other than the first switch circuit 542*a*, i.e., the other circuits (e.g., the current integrator circuit CI, the sample and hold circuit SH, etc.) and absorb noise or the like occurring in the other circuits, the ground voltage may be unstable.

In an embodiment, the potential of the sensing reference voltage should always be constant, and thus, if the ground voltage is unstable, sensing accuracy of the pixel is deteriorated.

In an embodiment, to solve this problem, the internal ground GND, 510 may include a first ground conductor 610 and a second ground conductor 620 as shown in FIG. 6.

The first ground conductor 610 may be electrically connected to the other circuits such as the current integrator circuit CI and the sample and hold circuit SH.

In addition, the second ground conductor 620 may be a conductor branched from a portion of the first ground conductor 610.

This second ground conductor 620 may be electrically connected to the first input terminal.

As described above, when the second ground conductor 620 is branched from the first ground conductor 610, it is possible to prevent noise occurring in the other circuits from flowing into the second ground conductor 620. Therefore, a stable ground voltage may be generated in the second ground conductor 620.

As described above, the first ground conductor 610 and the second ground conductor 620 may be formed in one of a plurality of layers LAYER included in the source driver IC 500. In other words, the first ground conductor 610 and the second ground conductor 620 may be formed on the same plane.

Figure 7:
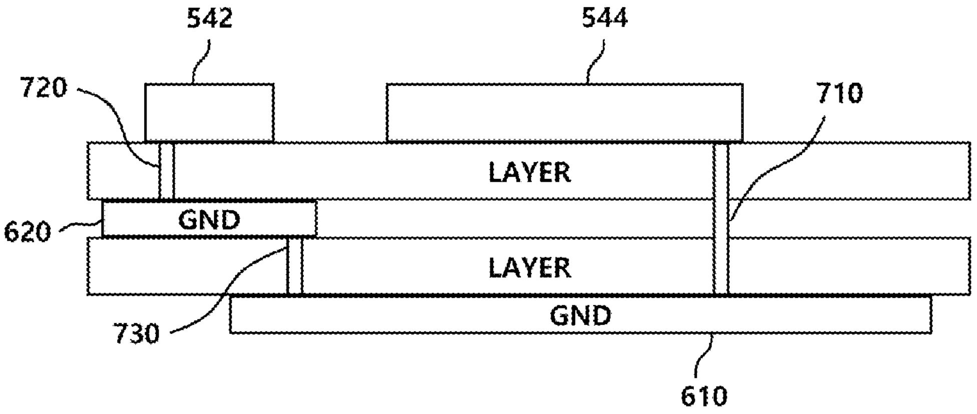
FIG. 7 is a view illustrating a configuration for disposing an internal ground in a source driver IC according to an embodiment.

Also, the first ground conductor 610 and the second ground conductor 620 may be respectively formed on different layers as shown in FIG. 7.

In addition, the first ground conductor 610 may be electrically connected to the two or more sensing channel circuits 544, which are the other circuits, through a first contact hole 710.

The second ground conductor 620 may be electrically connected to the two or more switch circuits 542 through a second contact hole 720.

The first ground conductor 610 and the second ground conductor 620 may be electrically connected to each other through a third contact hole 730.

What is claimed is:

1. A display device comprising:

a display panel including a plurality of pixels; and a source driver integrated circuit sensing an electrical characteristic of the display panel, wherein the source driver integrated circuit comprises:

an internal ground;

a first switch circuit including a first node that is electrically connected with the internal ground and a third node that is electrically connected with a sensing line of the display panel;

a driving reference voltage terminal to which a driving reference voltage is supplied;

a second switch circuit including a second node that is electrically connected with the driving reference voltage terminal and a fourth node that is electrically connected with the sensing line; and a sensing channel circuit electrically connected with the internal ground and configured to receive a signal corresponding to an electrical characteristic of a pixel included in the display panel through the sensing line.

2. The display device of claim 1, wherein the first switch circuit is configured to transfer, when turned on in a sensing mode, a sensing reference voltage supplied from the internal ground to the sensing line, and is configured to be turned off in a display mode; and the second switch circuit is configured to transfer, when turned on in the display mode, the driving reference voltage to the sensing line, and is configured to be turned off in the sensing mode.

3. The display device of claim 2, wherein the pixel includes an organic light emitting diode (OLED), a driving transistor, and a switching transistor, and the switching transistor is turned on in the sensing mode.

4. The display device of claim 3, wherein, in the sensing mode, the first switch circuit is temporarily turned on and then turned off, and when the first switch circuit is turned off in the sensing mode, the switching transistor is turned on.

5. The display device of claim 4, wherein, when the first switch circuit is temporarily turned on, the sensing reference voltage is transferred to a first node of the driving transistor through the sensing line so that a voltage of the first node of the driving transistor is initialized to the sensing reference voltage.

6. The display device of claim 5, wherein, when the first switch circuit is turned off and the switching transistor is turned on, a data voltage for sensing is transferred to a second node of the driving transistor.

7. The display device of claim 6, wherein an analog signal indicating the electrical characteristic of the pixel is formed at the first node of the driving transistor, and the analog signal is transferred to the sensing channel circuit through the sensing line.

8. The display device of claim 3, wherein the electrical characteristic of the pixel includes a threshold voltage of the driving transistor and/or parasitic capacitance of the OLED.

9. The display device of claim 2, wherein the first switch circuit is temporarily turned on and then turned off in the sensing mode.

10. The display device of claim 2, wherein the second switch circuit is temporarily turned on and then turned off in the display mode.

11. The display device of claim 2, further comprising:

a data channel circuit configured to supply a data voltage to a data line connected to the pixel in the display mode.

12. The display device of claim 2, wherein the driving reference voltage is greater than the sensing reference voltage.

13. The display device of claim 1, wherein the electrical characteristic of the pixel includes a current characteristic of the pixel, the sensing channel circuit includes (i) a current integrator circuit configured to integrate the current characteristic of the pixel and output an integrated value, and (ii) a sample and hold circuit configured to sample and hold the integrated value, the current integrator circuit is electrically connected with the internal ground, and the sample and hold circuit is electrically connected with the internal ground.

14. The display device of claim 13, wherein the internal ground includes:

a first ground conductor electrically connected with the current integrator circuit and with the sample and hold circuit; and a second ground conductor electrically connected with the first node and branched from a portion of the first ground conductor.

15. The display device of claim 14, further comprising a plurality of layers, wherein the first ground conductor and the second ground conductor are respectively disposed in different layers and electrically connected with each other through a contact hole.

16. The display device of claim 1, wherein the electrical characteristic of the pixel includes a voltage characteristic of the pixel, the sensing channel circuit includes a sample and hold circuit configured to sample and hold the voltage characteristic of the pixel, and the sample and hold circuit is electrically connected with the internal ground.

17. The display device of claim 16, wherein the internal ground includes a first ground conductor electrically connected with the sample and hold circuit and a second ground conductor electrically connected with the first node and branched from a portion of the first ground conductor.

18. The display device of claim 1, wherein the first switch circuit includes a first switch configured to electrically connect the first node with the third node, and the second switch circuit includes a second switch configured to electrically connect the fourth node with the common node.

19. The display device of claim 1, wherein the internal ground is electrically connected with the sensing channel circuit.

20. The display device of claim 1, wherein the driving reference voltage is supplied from an external voltage source.

* * * * *